(12) United States Patent
Ayorinde

(10) Patent No.: US 6,361,635 B1
(45) Date of Patent: Mar. 26, 2002

(54) METHOD OF FABRICATING A FILAMENT WOUND VESSEL

(75) Inventor: A. John Ayorinde, Lincoln, NE (US)

(73) Assignee: Shade, Inc., Lincoln, NE (US)

( * ) Notice: Subject to any disclaimer, the term of this patent is extended or adjusted under 35 U.S.C. 154(b) by 0 days.

(21) Appl. No.: 09/480,085

(22) Filed: Jan. 10, 2000

(51) Int. Cl.[7] .............................................. B65H 81/00
(52) U.S. Cl. ...................... 156/169; 156/172; 156/173; 156/174; 156/175; 156/256
(58) Field of Search ................................ 156/169, 172, 156/173, 174, 175, 256; 220/289, 290

(56) References Cited

U.S. PATENT DOCUMENTS

| | | | | |
|---|---|---|---|---|
| 3,228,549 A | * | 1/1966 | Courtney | 220/589 |
| 3,750,823 A | * | 8/1973 | Carter et al. | 220/589 |
| 4,561,568 A | * | 12/1985 | Hoffmeister et al. | 220/590 X |
| 4,684,423 A | * | 8/1987 | Brooks | 156/156 |
| 5,032,016 A | * | 7/1991 | Youngkeit | 359/853 |
| 5,273,603 A | * | 12/1993 | Park et al. | 156/175 |
| 5,348,698 A | * | 9/1994 | Park et al. | 264/154 |
| 5,865,923 A | * | 2/1999 | Johnson | 156/172 |
| 6,039,827 A | * | 3/2000 | Cramer | 156/173 |

* cited by examiner

Primary Examiner—Jeff H. Aftergut
(74) Attorney, Agent, or Firm—John R. Hoffman

(57) ABSTRACT

A method of fabricating a filament wound container includes providing a mandrel for winding a filament composite structure of a given thickness and having a closed end. The closed end is removed from the remainder of the composite structure, and the mandrel then is removed from the composite structure. A replacement closed-end member is positioned on the composite structure at the location of the removed closed end. The replaced closed-end member may be the original removed closed end. An overwrap thickness is filament wound about at least a portion of the composite structure and the replaced closed-end member.

32 Claims, 5 Drawing Sheets

METHOD OF FABRICATING A FILAMENT WOUND VESSEL

FIELD OF THE INVENTION

This invention generally relates to the art of filament wound composite structures and, particularly, to a method of fabricating a filament wound vessel, such as a pressure vessel, chemical or water storage tanks, rocket motor cases or any tubular structure that requires end closures. Tubular structures may be cylindrical, rectangular, triangular, ellipsoidal, square or other polygonal shapes.

BACKGROUND OF THE INVENTION

Various types of vessels, such as pressure vessels, rocket casings, and other tubular structures and the like, are fabricated with wall structures of filament wound composite materials. In other words, the thickness of the walls is built up by winding filaments associated with an appropriate resin, whereafter the assembly is cured to form what is called a "filament composite structure". The filaments may be of glass, graphite or like material. The thickness of the structural walls are built up by winding hoop or helical layers in a desired pattern. In some instances, an impermeable liner or bladder may be used inside the filament composite structure. In some instance, a core or foam layer or thickness may be sandwiched between filament wound layers. A structural inner skin or layer and a structural outer skin or layer may be separated by a hollow space that may be vacuumed to reduce heat transfer between the inner and outer skins. The core may be made of lightweight material such as a honeycomb core, closed foam, balsa wood or the like. Various fittings, such as a polar boss at a closed end of the vessel, may be integrated in the composite structure and held in place by the filament windings. A manway may be installed along the cylindrical surface of the structure with no openings at the domes except discharging faucets and the like.

Filament wound vessels of the character described above typically are fabricated by winding and building-up the composite wall structure on a mandrel. The mandrel and the resulting filament wound vessel typically has one or more dome-shaped closed ends. For instance, a filament wound vessel may have a generally cylindrical portion extending a major length of the vessel corresponding to a cylindrical mandrel about which the vessel is wound. The ends of the mandrel are generally ellipsoidal to form opposite dome-shaped closed ends which may or may not have various fittings, such as polar bosses. The cylindrical portion of the vessel is formed by hoop and longitudinal filament windings. The longitudinal windings may be wound using either helical or polar patterns and extend into the domes at each end of the cylindrical section. After the filament composite structure of the vessel is built-up on the mandrel, the entire assembly is cured and the vessel is removed from the mandrel.

Problems continue to plague fabrication processes as described above, particularly in removing the mandrel or mandrel tooling. Segmented metal mandrels have been used with some success. A segmented mandrel is broken down and removed through an opening in the vessel (i.e., from the inside-out). Unfortunately, segmented mandrels are extremely expensive, very labor intensive and sacrifice tolerance repeatability. Water soluble sand mandrels have been effective for large pressure vessels and rocket motor casings, but the binder in the sand is limited to low temperature cures. In addition, dimensional repeatability of sand surfaces can be a variable or requires extremely expensive tooling. Simply cutting the vessel and reattaching domes by bolts presents sealing problems, particularly when the vessel is used as a pressure vessel.

The present invention is directed to solving this myriad of problems by a simple fabrication process which not only affords easy removal of the mandrel tooling used in fabricating a pressure vessel, but the originally wound closed end of the vessel can easily be replaced by a different closed end which may be very difficult or impossible to fabricate by filament winding processes.

SUMMARY OF THE INVENTION

An object, therefore, of the invention is to provide a new and improved method of fabricating a filament wound container of the character described.

In the exemplary embodiment of the invention, the method includes the steps of providing a mandrel for winding a filament composite structure of a given thickness and having a closed end. The composite structure is filament wound on the mandrel, and the closed end is removed from the remainder of the composite structure. The mandrel is removed from the structure, and a replacement closed-end member is replaced on the structure at the location of the removed closed end. An overwrap thickness then is filament wound about at least a portion of the composite structure and the replaced closed-end member.

As disclosed herein, the mandrel and the container are generally cylindrical with dome-shaped closed ends. One of the dome-shaped ends is removed from the cylindrical remainder of the composite structure by cutting along a tangent line between the closed end and the cylindrical section of the structure.

The removed dome-shaped closed end may be replaced with a closed-end member of a different configuration, such as a relatively flat closed-end member. The removed dome-shaped closed end may be replaced with a closed-end member of a different material or with a member having multiple openings which would be difficult or impossible to fabricated by filament winding processes.

The invention contemplates that a joint section can be embedded in the composite structure, with the dome-shaped closed end being removed along the joint section. Seal means are provided on the joint section after the dome-shaped closed end is removed, for sealing with the replaced close-end member. For instance, circular grooves may be formed in a face of the joint section for receiving the seal means, such as O-ring seals.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
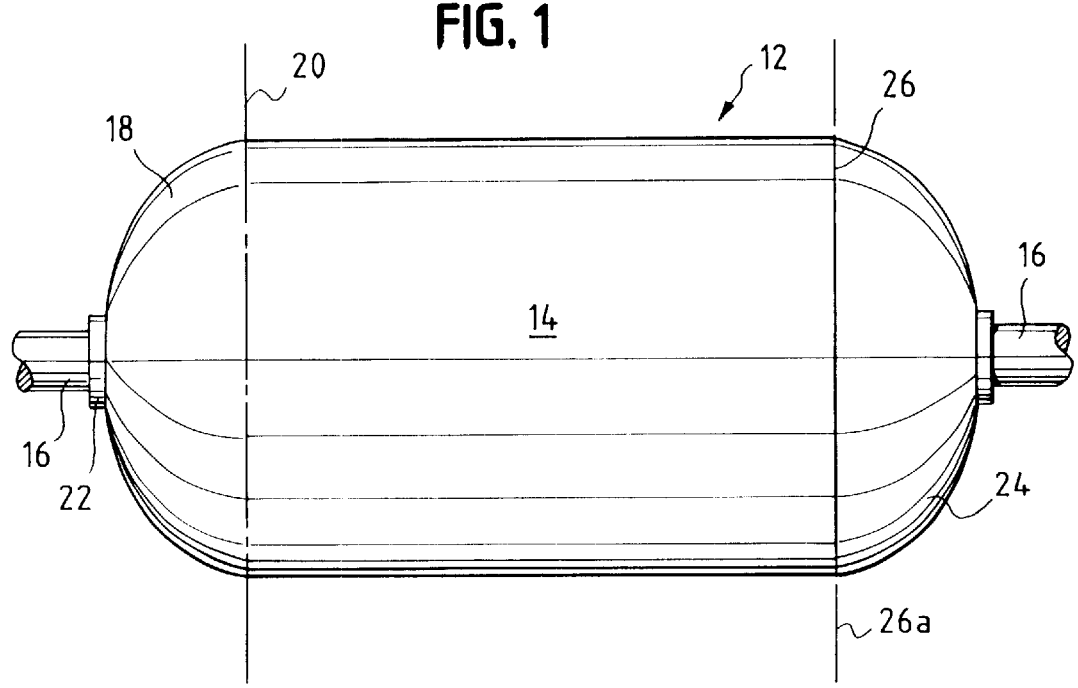
FIG. 1 is an elevational view of a mandrel as might be used in fabricating a filament wound container, according to the invention.

Referring to the drawings in greater detail, and first to FIG. 1, the invention is embodied in a method of fabricating a filament wound container on a mandrel, generally designated 12. The mandrel is elongated and includes a central cylindrical portion 14 concentric about a shaft 16 which defines the wind axis of the mandrel. A permanent dome-shaped closed end 18 is integral with cylindrical central portion 14 along a hypothetical tangent line 20. A fitting, such as a polar boss 22, may be secured in closed end 18 and about which the container is wound. The opposite end of the mandrel is formed by another dome-shaped closed end 24, but closed end 24 is removable from cylindrical central portion 14 along a parting line 26 which also defines a second hypothetical tangent line 26a between the removable dome-shaped closed end 24 and cylindrical central portion 14.

Figure 2:
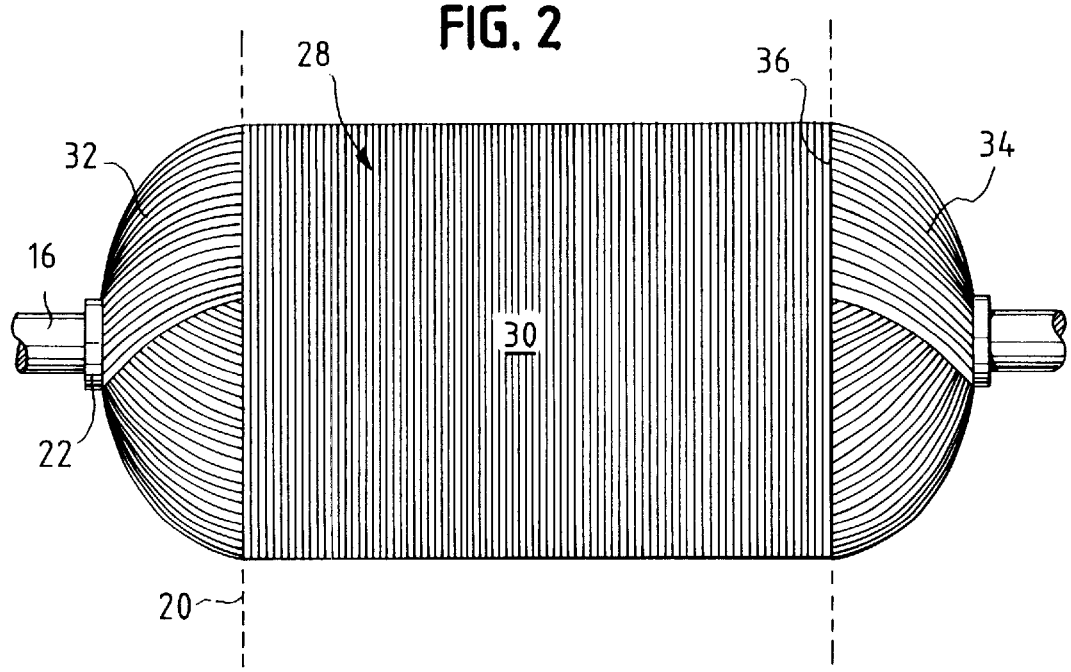
FIG. 2 is an elevational view of the partially formed filament composite container wound on the mandrel.

FIG. 2 shows a partially formed filament wound container, generally designated 28, which has been wound about mandrel 12 and, therefore, assumes the shape of the mandrel. In other words, the partially formed filament wound container 28 has a cylindrical central portion 30 and opposite dome-shaped closed ends 32 and 34. As will be seen below, closed end 34 can be removed along a trim or cut line shown by dotted line 36. Cylindrical center portion 30 of the vessel is filament wound by winding the filaments in hoop and longitudinal (helical or polar) layers, with the longitudinal layers moving in a prescribed pattern over the dome-shaped closed ends 32 and 34. The filaments may be glass, graphite, Kevlar or the like, as economics might dictate. Various resins are used with the wound filaments. After winding, the partially formed container is cured on the mandrel.

Figure 3:
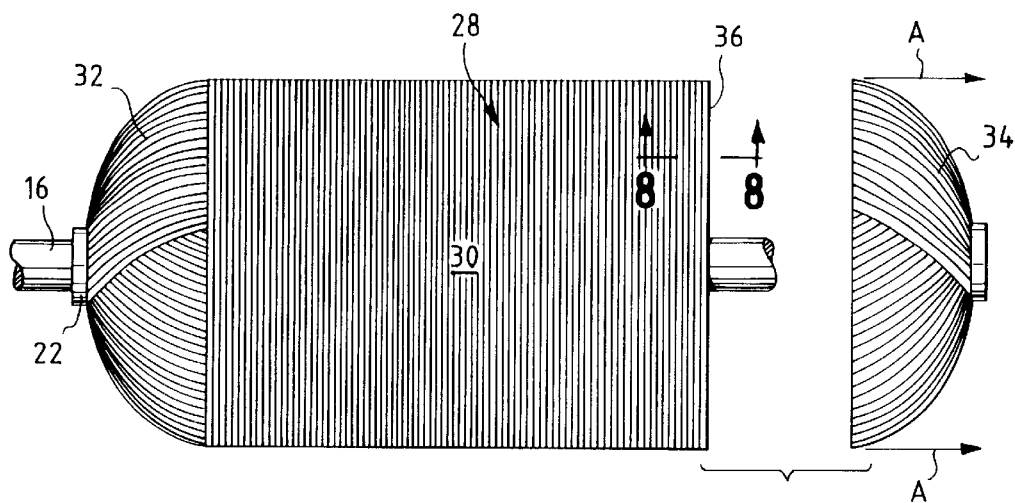
FIG. 3 is a view similar to that of FIG. 2, showing one of the dome-shaped closed ends of the container being removed.

FIG. 3 shows dome-shaped closed end 34 having been cut from cylindrical central portion 30 of the container along trim line 36. The end section is removed in the direction of arrows "A" along with the removable end portion 24 (FIG. 1) of mandrel 12. It should be understood that a similar operation can be performed at the other closed end. In other words, one or both closed ends 32 and 34 at opposite ends of cylindrical central portion 30 can be removed and replaced, for symmetry considerations for instance.

Figure 4:
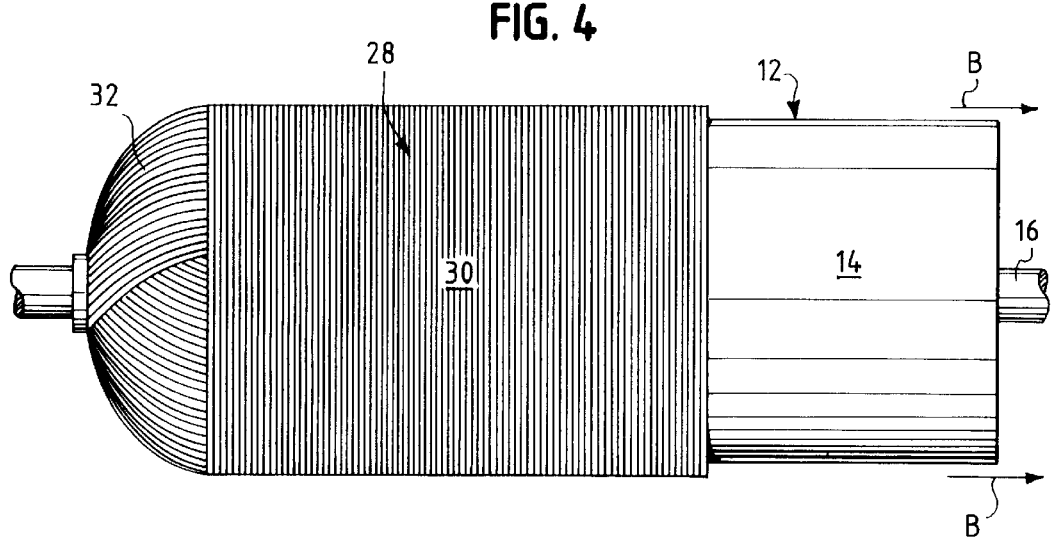
FIG. 4 is a view similar to that of FIG. 3, showing the mandrel being removed.

FIG. 4 shows mandrel 12 being removed from the cured partially formed filament wound container 28 in the direction of arrows "B". Of course, at this point in the fabrication, the container is formed of cylindrical central portion 30 and the one dome-shaped closed end 32, the opposite dome-shaped end 34 having been removed as described in relation to FIG. 3. Of course, this does not preclude removing and replacing both dome-shaped closed ends.

Figure 5:
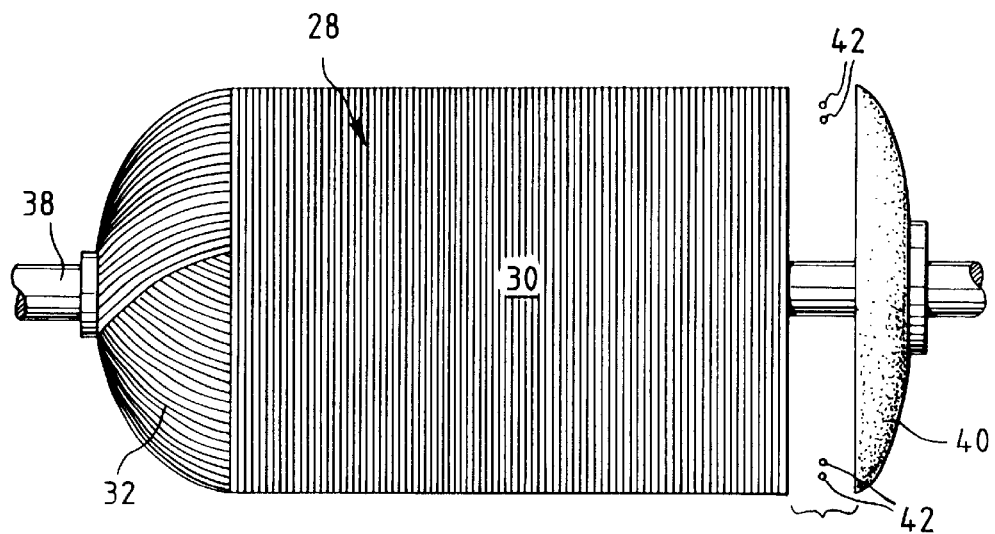
FIG. 5 is a view of a replacement closed-end member being assembled to the container.

FIG. 5 shows the partially formed pressure container 28, with closed end 34 removed, repositioned on a shaft 38 which defines another wind access for the container. A replacement closed-end member 40, along with a pair of seals 42 (O-rings, cup seals or the like) as described hereinafter, is replaced on the partially formed container at the same location as the removed dome-shaped closed end 34. It can be seen that the replacement closed-end member 40 may be significantly flatter than the removed closed end 34. In fact, replacement member 40 may be of any configuration that would even be impossible to filament wind with the remainder of the container (i.e., cylindrical portion 30 and dome-shaped closed end 32). Replacement closed-end member 40 may be fabricated off-line by completely different manufacturing methods such as compression molding, resin transfer molding, resin infusion, vacuum assisted resin transfer molding, resin film infusion, lay-up autoclave curing or other procedures.

It should be understood that if both dome-shaped closed ends 32 and 34 are removed and the mandrel is removed, no wind access spanning the entire container will be used. Instead, a stub access will be fabricated on the replacement domes and this will act as the wind access. Once the mandrel is removed, the composite structure will be quite lightweight and the pre-molded wind access in the new domes will be strong enough to carry the vessel through winding. Once the winding is complete, the stub access will be trimmed off flush with the overwrap thickness, described below.

Figure 6:
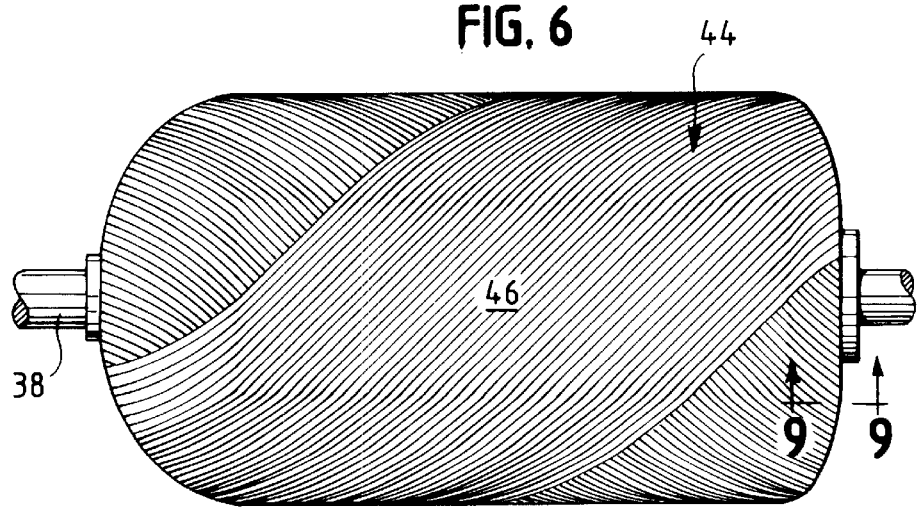
FIG. 6 is an elevational view of the container and replaced closed-end member having been filament wound with an overwrap thickness.

FIG. 6 shows a final filament wound container, generally designated 44, according to the invention. The final vessel is formed by filament winding an overwrap thickness 46 about the assembled structure shown in FIG. 5, namely about partially formed vessel 28 and replacement closed-end member 40. The filament wound overwrap thickness 46 then is cured to form the final filament composite structure of container 44.

Figure 7:
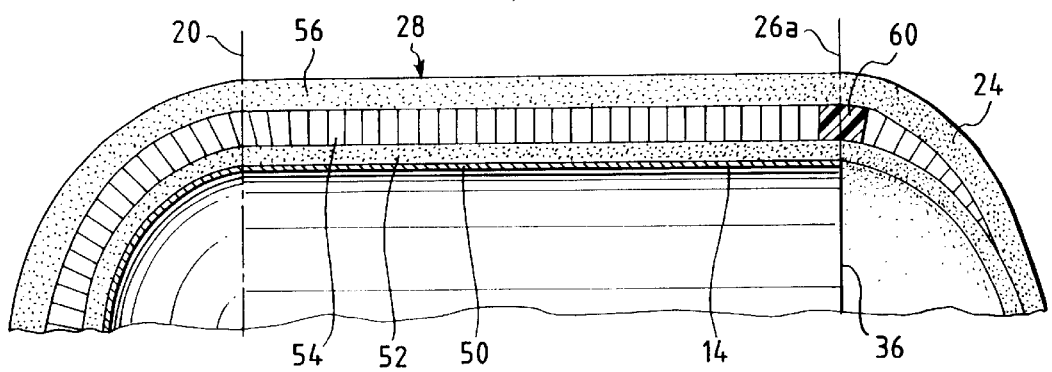
FIG. 7 is a fragmented axial section through the filament wound container prior to removing the dome-shaped closed end thereof.

FIG. 7 shows in greater detail one type of filament composite structure that might be used for the container. It should be understood that the invention is equally applicable for different composite thicknesses. FIG. 7 corresponds to partially formed container 28 after it has been cured at the end of the process described above in relation to FIG. 2.

More particularly, a liner 50 of release material such as Teflon, polyphenylene, sulphone, polyetherether ketone or the like may be positioned over mandrel 12, at least over cylindrical central portion 14 and permanent dome-shaped closed end 18 if desired. The liner should be of non-permeable material and cover at least cylindrical central portion 14 and permanent closed end 18. Inner structural layers 52 of filament wound composite material then is wound about the liner. The inner structural layers are wound in hoop and longitudinal layers in desired patterns. The filaments may be of glass, graphite or Kevlar material and the resin system type is optional.

Still referring to FIG. 7, a core or foam sandwich structure 54 is laid-up on inner filament wound layers 52 and an outer structural thickness 56 of filament composite material is wound about the core structure. The outer structural thickness may be wound similar to the inner structural thickness 52. Core 54 may be made of lightweight material such as a honeycomb core, closed foam, balsa wood or the like. When core structure 54 is laid-up on inner structural thickness 52, a ring-like joint section 60 may be positioned straddling tangent line 36 which corresponds to the subsequent trim or cut line whereat dome-shaped closed end 34 is removed as described in relation to FIG. 3. The ring-like joint section may also be installed by laying up or hoop winding a composite structure during the winding operation. The ring-like joint section is fabricated of a dense material which can be polished or machined to make a sealing surface. When dome-shaped closed end 34 is removed by cutting along line 36, joint section 60 also is simultaneously cut along that line.

Figure 8:
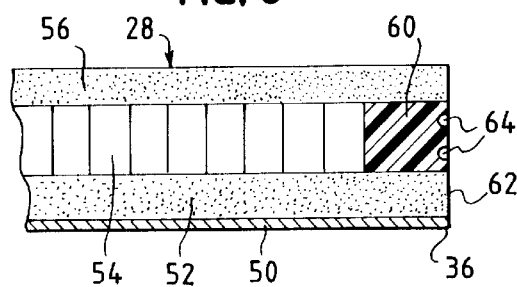
FIG. 8 is an enlarged fragmented section taken through one side of the container, generally along line 8—8 of FIG. 3.

FIG. 8 shows cut line 36 through joint section 60 for removing closed end 34 (FIG. 3). The cut forms a circular or annular face 62 of the ring-shaped joint section 60. This face can be polished and one or more grooves 64 for seal faces may be cut in the face circumferentially about the joint section. Rather than machining grooves 64, an alternate technique would be to use buried O-rings or seals in the joint section, which would be removed during the cutting operation to automatically provide subsequent pre-fabricated grooved sealing surfaces.

Figure 9:
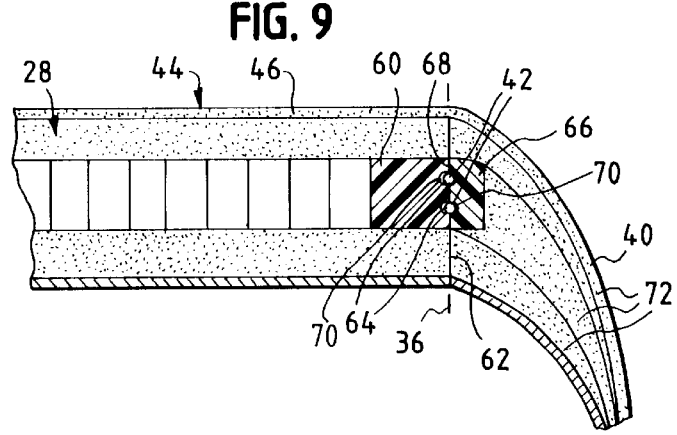
FIG. 9 is a fragmented axial section taken generally along line 9—9 of FIG. 6.

FIG. 9 shows replacement closed-end member 40 having been positioned against or mated with partially formed vessel 28, with filament wound overwrap 46 thereabout. The replacement member includes a joint section 66 of a dense material like joint section 60 and a machined face 68 for abutting or mating with face 62 of joint section 60. Joint section 66 also has circular grooves 70 which are in direct opposed alignment with grooves 64 (FIG. 8) in joint section 60. It can be seen that O-ring seals 42 (FIG. 5) have been positioned within the opposing grooves 64 and 70 to form a seal means between replacement end section 40 and vessel 28. The seal means prevents migration of the container contents from going into the container wall. If the original dome-shaped end 34 is reinstalled, then the buried O-ring or seal technique could be employed to provide both sealing surfaces 64 and 70 simultaneously.

Still referring to FIG. 9, replacement end section 40 can be fabricated of a wide variety of configurations and materials by a wide variety of processes. Suffice it to say, the end section has various filament layers 72 surrounding joint section 66. It can be seen that the filament wound overwrap 46 (FIG. 6) completely surrounds the final filament wound container.

Figure 10:
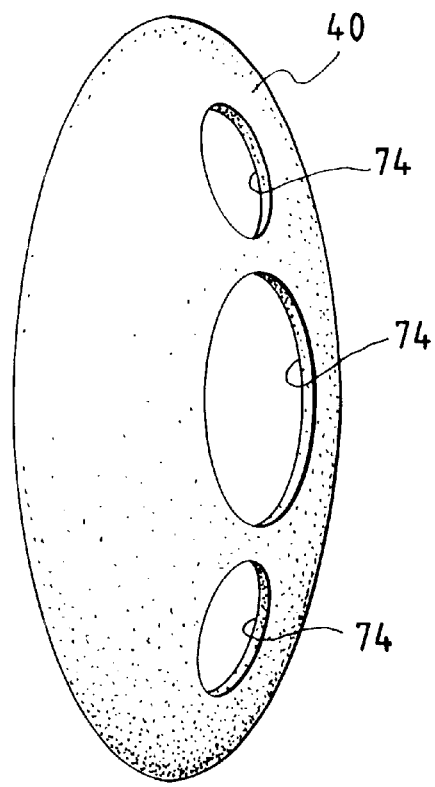
FIG. 10 is a perspective view showing a replacement closed-end member having multiple openings.
Figure 11:
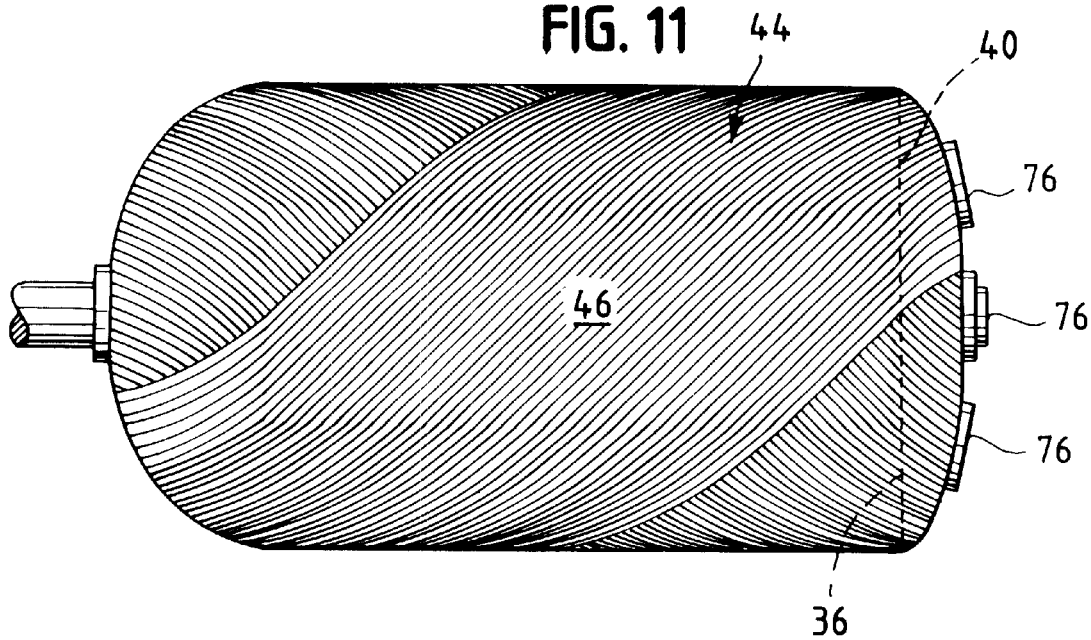
FIG. 11 is an elevational view of a container incorporating the closed-end member of FIG. 10, along with various fittings positioned in the multiple openings.

FIG. 10 shows but one of many configurations of a replacement closed-end member 40. This configuration includes a plurality of openings 74 which would be extremely difficult if at all possible to filament wind with the remainder of the filament wound container by known methods. The replacement end member is very flat as can be seen in FIG. 11. A plurality of fittings 76 also are shown in FIG. 11 mounted within openings 74 shown in FIG. 10. This is but one example of the many advantageous alternative structures that can be fabricated by using the method of the present invention.

Finally, the two ends of the tank may be closed completely, with no opening except for drain faucets for instance. Therefore, a manway will be installed in the cylindrical section of the container. To achieve this object, a pre-fabricated composite insert will be installed and bonded to the initial filament plies near the mandrel. When the container is completed, the insert will be removed. The pre-fabricated manway then will be installed. The manway will be installed by screwing it into the composite insert. A thread lock will be applied to keep the manway in place. A hinged cover for the manway may be provided for easy opening.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of fabricating a filament wound container, comprising the steps of:

providing a mandrel for winding a generally cylindrical filament composite structure of a given thickness and having opposite, substantially closed ends with at least one end being a dome-shaped closed end;

filament winding said composite structure on the mandrel;

removing said dome-shaped closed end from the remainder of the composite structure;

removing the mandrel from the composite structure through an opening vacated by the removed dome-shaped closed-end;

replacing a closed-end member on the composite structure at the location of the removed dome-shaped closed end; and filament winding an overwrap thickness about at least a portion of the composite structure and the replaced closed-end member.

2. The method of claim 1 wherein said dome-shaped closed end is removed from the remainder of the composite structure by cutting along a tangent line between the dome-shaped closed end and a cylindrical section of the composite structure.

3. The method of claim 1 wherein said removed dome-shaped closed end is replaced with a closed-end member of a different configuration.

4. The method of claim 3 wherein said removed dome-shaped closed end is replaced with a relatively flat closed-end member.

5. The method of claim 1 wherein said removed dome-shaped closed end is replaced with a closed-end member having multiple openings.

6. The method of claim 1 wherein said removed dome-shaped closed end is replaced with a closed-end member of a different material.

7. The method of claim 1 wherein a joint section is embedded in said composite structure, and the dome-shaped closed end is removed along said joint section.

8. The method of claim 7, including providing seal means on the joint section after the dome-shaped closed end is removed for sealing with the replaced closed-end member.

9. The method of claim 8, including forming groove means in a face of the joint section for receiving the seal means.

10. The method of claim 8 wherein said seal means is pre-laid up in the joint section.

11. The method of claim 1 wherein said replaced closed-end member comprises the removed dome-shaped end.

12. A method of fabricating a filament wound container, comprising the steps of:

providing a mandrel for winding a generally cylindrical filament composite structure of a given thickness and having opposite, substantially closed ends with at least one end being a dome-shaped closed end;

filament winding said composite structure on the mandrel;

embedding a joint section in the filament wound composite structure at a tangent line between the dome-shaped closed end and the remainder of the structure;

removing said dome-shaped closed end from the remainder of the composite structure by cutting along said tangent line;

removing the mandrel from the composite structure through an opening vacated by the removed dome-shaped closed end;

replacing a closed-end member on the composite structure at the location of the removed dome-shaped closed end, the member being a different configuration than that of the removed dome-shaped closed end; and filament winding an overwrap thickness about at least a portion of the composite structure and the replaced closed-end member.

13. The method of claim 12 wherein said removed dome-shaped closed end is replaced with a relatively flat closed-end member.

14. The method of claim 12 wherein said removed dome-shaped closed end is replaced with a closed-end member having multiple openings.

15. The method of claim 12 wherein said removed dome-shaped closed end is replaced with a closed-end member of a different material.

16. The method of claim 12, including providing seal means on the joint section after the dome-shaped closed end is removed for sealing with the replaced closed-end member.

17. The method of claim 16, including forming groove means in a face of the joint section for receiving the seal means.

18. The method of claim 16 wherein said seal means is pre-laid up in the joint section.

19. The method of claim 12, including providing said closed-end member with a joint section for mating with the joint section embedded in said composite structure.

20. The method of claim 12 wherein said replaced closed-end member comprises the removed dome-shaped end.

21. A method of fabricating a filament wound container, comprising the steps of:

providing a mandrel for winding a filament composite structure of a given thickness and having opposite, substantially closed ends;

filament winding said composite structure on the mandrel;

removing one closed end from the remainder of the composite structure;

removing the mandrel from the composite structure through an opening vacated by the removed closed end;

replacing a closed-end member on the composite structure at the location of the removed closed end; and filament winding an overwrap thickness about at least a portion of the composite structure and the replaced closed-end member.

22. The method of claim 21 wherein said one closed end is removed from the remainder of the composite structure by cutting along a tangent line between the one closed end and a cylindrical section of the composite structure.

23. The method of claim 21 wherein said removed closed end is replaced with a closed-end member of a different configuration.

24. The method of claim 23 wherein said removed closed end is replaced with a relatively flat closed-end member.

25. The method of claim 21 wherein said removed closed end is replaced with a closed-end member having multiple openings.

26. The method of claim 21 wherein said removed closed end is replaced with a closed-end member of a different material.

27. The method of claim 21 wherein a joint section is embedded in said composite structure, and the one closed end is removed along said joint section.

28. The method of claim 27, including providing seal means on the joint section after the one closed end is removed for sealing with the replaced closed-end member.

29. The method of claim 28 wherein said seal means is pre-laid up in the joint section.

30. The method of claim 27, including forming groove means in a face of the joint section for receiving the seal means.

31. The method of claim 21 wherein said replaced closed-end member comprises the removed dome-shaped end.

32. A method of fabricating a filament wound container, comprising the steps of:

providing a mandrel for winding a filament composite structure of a given thickness and having a closed end;

filament winding said composite structure on the mandrel;

removing the closed end from the remainder of the composite structure;

removing the mandrel from the composite structure through an opening vacated by the removed closed end;

replacing a closed-end member on the composite structure at the location of the removed closed end;

providing seal means between the replaced closed-end member and the remainder of the composite structure; and filament winding an overwrap thickness about at least a portion of the composite structure, the seal means and the replaced closed-end member.

* * * * *